US010738657B2

(12) United States Patent
Morisawa et al.

(10) Patent No.: US 10,738,657 B2
(45) Date of Patent: Aug. 11, 2020

(54) GAS TURBINE FACILITY EXHAUST GAS SUPPLY HEAT EXCHANGE ARRANGEMENT

(71) Applicant: Toshiba Energy Systems & Solutions Corporation, Kawasaki-shi (JP)

(72) Inventors: Yuichi Morisawa, Yokohama (JP); Hideyuki Maeda, Yokohama (JP); Yasuaki Nakamura, Yokohama (JP); Yasunori Iwai, Yokohama (JP); Masao Itoh, Yokohama (JP)

(73) Assignee: Toshiba Energy Systems & Solutions Corporation, Kawasaki-shi (JP)

( * ) Notice: Subject to any disclaimer, the term of this patent is extended or adjusted under 35 U.S.C. 154(b) by 142 days.

(21) Appl. No.: 15/678,167

(22) Filed: Aug. 16, 2017

(65) Prior Publication Data

US 2017/0342860 A1    Nov. 30, 2017

Related U.S. Application Data

(63) Continuation of application No. PCT/JP2016/001446, filed on Mar. 14, 2016.

(51) Int. Cl.
*F01D 25/26* (2006.01)
*F23R 3/44* (2006.01)
(Continued)

(52) U.S. Cl.
CPC ............... *F01D 25/26* (2013.01); *F02C 3/34* (2013.01); *F02C 7/141* (2013.01); *F23R 3/06* (2013.01);
(Continued)

(58) Field of Classification Search
CPC ...... F02C 1/00; F02C 1/08; F02C 3/00; F02C 3/30; F02C 3/34; F02C 7/08; F02C 7/10;
(Continued)

(56) References Cited

U.S. PATENT DOCUMENTS 6,871,503 B1 * 3/2005 Inoue .................. F23R 3/12
60/737
10,260,373 B2 * 4/2019 Lewis .................. F01D 25/18

FOREIGN PATENT DOCUMENTS

| JP | 11-257660 | 9/1999 |
| JP | 2000-337107 | 12/2000 |
| JP | 2016-008590 | 1/2016 |

OTHER PUBLICATIONS

International Search Report dated Jun. 7, 2016 in PCT/JP2016/001446 filed Mar. 14, 2016 (with English Translation of Categories of Cited Documents).

(Continued)

*Primary Examiner* — Jason H Duger
(74) *Attorney, Agent, or Firm* — Oblon, McClelland, Maier & Neustadt, L.L.P.

(57) ABSTRACT

A gas turbine facility of an embodiment includes: a combustor casing; a combustor provided in the combustor casing; a cylinder surrounding a periphery of the combustor and dividing a space between the combustor casing and the combustor; a turbine rotated by combustion gas exhausted from the combustor; a heat exchanger cooling the combustion gas exhausted from the turbine; a pipe through which a part of the combustion gas cooled in the heat exchanger passes in the heat exchanger to be heated, the pipe guiding the combustion gas heated in the heat exchanger into the cylinder; and a pipe guiding another part of the combustion gas cooled in the heat exchanger to a space between the combustor casing and the cylinder.

6 Claims, 8 Drawing Sheets

(51) Int. Cl.
     *F02C 3/34*     (2006.01)
     *F23R 3/06*     (2006.01)
     *F23R 3/26*     (2006.01)
     *F23R 3/14*     (2006.01)
     *F02C 7/141*    (2006.01)

(52) U.S. Cl.
     CPC .................. *F23R 3/14* (2013.01); *F23R 3/26* (2013.01); *F23R 3/44* (2013.01); *F05D 2260/213* (2013.01); *Y02E 20/16* (2013.01)

(58) Field of Classification Search
     CPC .... F02C 7/12; F02C 7/18; F02C 7/185; F02C 7/141; F23R 3/00; F23R 3/02; F23R 3/06; F23R 3/08; F23R 3/14; F23R 3/26; F23R 3/44; F23R 2900/03341; F23R 2900/03043; F23R 2900/03045; F23R 3/002; F23R 3/045; F23R 3/54; F23R 3/60; F01K 17/025; F01K 23/10; F01D 9/023; F01D 25/26; F05D 2260/213
     See application file for complete search history.

(56)             References Cited

OTHER PUBLICATIONS

Written Opinion dated Jun. 7, 2016 in PCT/JP2016/001446 filed Mar. 14, 2016.

\* cited by examiner

US 10,738,657 B2

GAS TURBINE FACILITY EXHAUST GAS SUPPLY HEAT EXCHANGE ARRANGEMENT

CROSS-REFERENCE TO RELATED APPLICATIONS

This application is a continuation of prior International Application No. PCT/JP2016/001446 filed on Mar. 14, 2016; the entire contents of all of which are incorporated herein by reference.

FIELD

Embodiments of the present invention relates to a gas turbine facility.

BACKGROUND

Increasing efficiency of power generation plants is in progress in response to demands for reduction of carbon dioxide, resource conservation, and the like. Specifically, increasing temperature of working fluid of a gas turbine and a steam turbine, employing a combined cycle, and the like are actively in progress. Further, research and development of recovery technology of carbon dioxide are in progress.

FIG. 8 is a system diagram of a conventional gas turbine facility 300. FIG. 9 is a view schematically illustrating a vertical section of a combustor 313 provided at the conventional gas turbine facility 300. In the conventional gas turbine facility 300, a turbine is operated while using carbon dioxide and water vapor generated in a combustor as working fluid, and a part of carbon dioxide exhausted from the turbine is circulated.

As illustrated in FIG. 8, in the conventional gas turbine facility 300, oxygen separated from an air separator (not-illustrated) is introduced to a pipe 340. The oxygen is then compressed in a compressor 310, and its flow rate is controlled by a flow rate regulating valve 311. The oxygen passing through the flow rate regulating valve 311 is heated by receiving heat from later-described combustion gas in a heat exchanger 312, and is supplied to combustor 313.

Fuel is guided from a fuel supply source (not-illustrated) to a pipe 341. The fuel is regulated in flow rate by a flow rate regulating valve 314 and is supplied to the combustor 313. This fuel is hydrocarbon.

As illustrated in FIG. 9, the oxygen supplied from the pipe 340 and the fuel supplied from the pipe 341 react (combat) in the combustor 313. Combustion gas containing carbon dioxide and water vapor is generated by this combustion. The flow rates of fuel and oxygen are regulated to be of a stoichiometric mixture ratio (theoretical mixture ratio) in a state that they are completely mixed.

The combustion gas generated 319 is combustor 313 is introduced to a turbine 315. Note that, for example, a generator 319 is coupled to the turbine 315, as illustrated in FIG. 8. The combustion gas which performed an expansion work in the turbine 315 passes through the heat exchanger 312. At this time, heat is emitted, and the oxygen flowing in the pipe 340 and the carbon dioxide flowing in a pipe 343 are heated.

The combustion gas passing through the heat exchanger 312 then passes through a cooler 316. At this time, the water vapor in the combustion gas condenses into water. The water passes through a pipe 342 and is exhausted to the outside.

The carbon dioxide separated from the water vapor compressed in a compressor 317 interposed in the pipe 343 to become supercritical fluid. A part of the compressed carbon dioxide is introduced to a pipe 344 branched off from the pipe 343. The carbon dioxide introduced into the pipe 344 is regulated in flow rate by a flow rate regulating valve 318 and is exhausted to the outside.

Meanwhile, a remaining part of the carbon dioxide flows in the pipe 343. Then, the carbon dioxide is heated in the heat exchanger 312 and is supplied into a combustor casing 350 accommodating the combustor 313 as illustrated in FIG. 9. A temperature of the carbon dioxide passing through the heat exchanger 312 is about 700° C. Here, the combustor casing 350 is constituted by an upstream side casing 351a and a downstream side casing 351b.

The carbon dioxide guided into the upstream side casing 351a flows toward the turbine 315 between the downstream side casing 351b and a combustor liner 352, a transition piece (tail pipe) 353.

When the carbon dioxide flows between the downstream side casing 351b and the combustor liner 352, the transition piece 353, the carbon dioxide cools the combustor liner 352 and the transition piece 353. This cooling is performed by, for example, porous film cooling, or the like. A part of the carbon dioxide is introduced into the combustor liner 352 and the transition piece 353 from hole 354, 556 of a porous film cooling part, dilution holes 355, and so on, as illustrated in FIG. 9. Besides, the carbon dioxide is also used for cooling of stator blades 360 and rotor blades 361 on the turbine 315.

The carbon dioxide introduced into the combustor liner 352 and the transition piece 353 is introduced to the turbine 315 together with the combustion gas produced by combustion. As stated above, the carbon dioxide other than the one exhausted from the pipe 344 circulates in the system.

Here, the upstream side casing 351a and the downstream side casing 351b are exposed to high-temperature carbon dioxide. The upstream side casing 315a and the downstream side casing 351b are therefore composed of an expensive Ni-based alloy.

As described above, in the convention gas turbine facility 300, the combustor casing 350 exposed to the high-temperature carbon dioxide has to be composed of the expense Ni-based alloy. Accordingly, a manufacturing cost of the gas turbine facility increases.

DETAILED DESCRIPTION

Hereinafter, embodiments of the present invention are described with reference to the drawings.

A gas turbine facility of an embodiment includes: a casing; a combustor provided in the casing to combust fuel and oxidant; a cylinder surrounding a periphery of the combustor, the cylinder dividing a space between the casing and the combustor; and a turbine rotated by combustion gas exhausted from the combustor.

Further, the gas turbine facility includes: a heat exchanger which cools the combustion gas exhausted from the turbine; a high-temperature combustion gas supply pipe through which a part of the combustion gas cooled in the heat exchanger passes in the heat exchanger to be heated, the high-temperature combustion gas supply pipe guiding the combustion gas heated in the heat exchanger into the cylinder by penetrating between the casing and the cylinder; and a low-temperature combustion gas supply pipe guiding another part of the combustion gas cooled in the heat exchanger to a space between the casing and the cylinder.

First Embodiment

Figure 1:
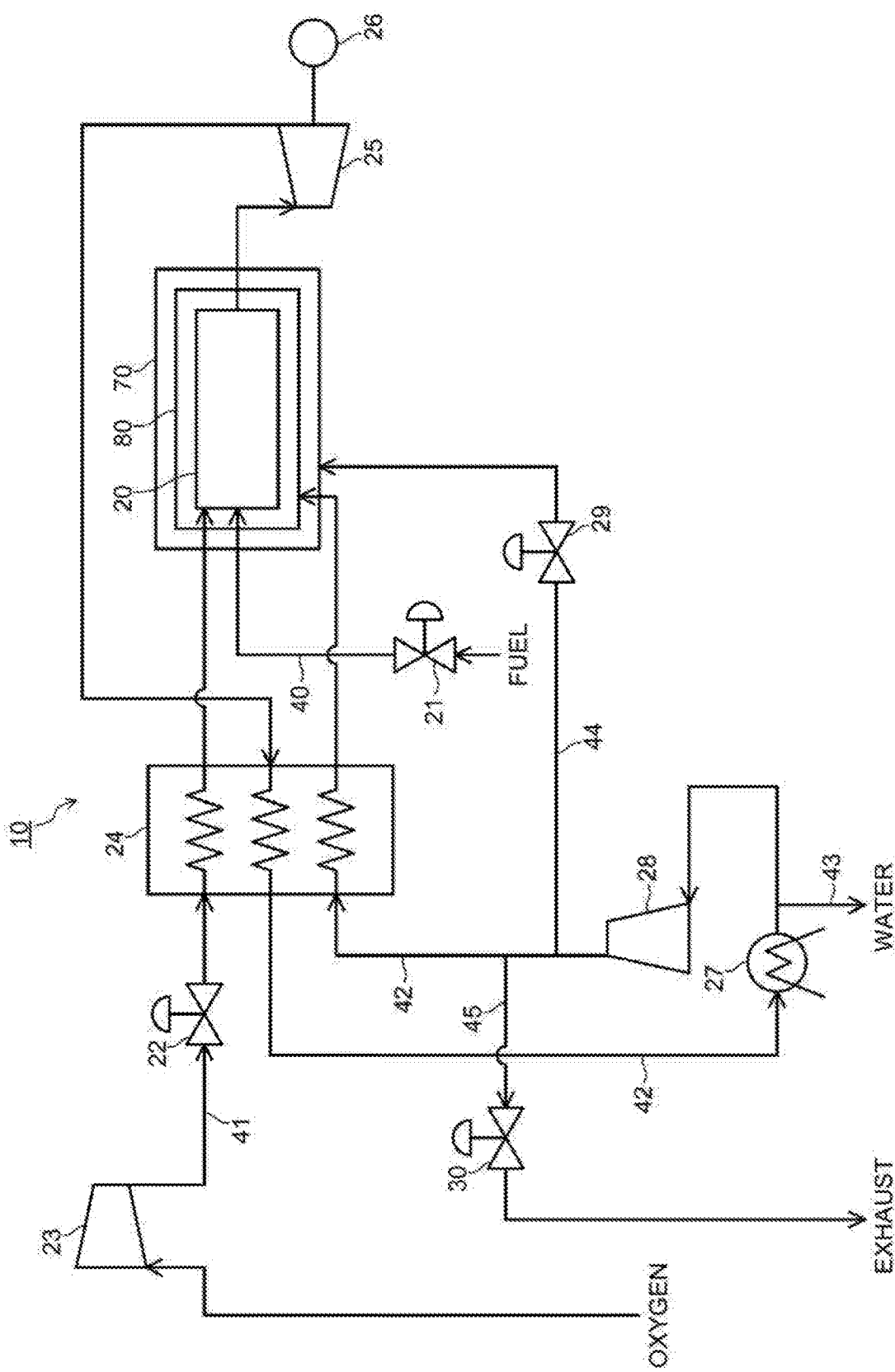
FIG. 1 is a system diagram of a gas turbine facility of a first embodiment.

FIG. 1 is a system diagram of a gas turbine facility 10 of a first embodiment. As illustrated in FIG. 1, the gas turbine facility 10 includes a combustor 20 which combusts fuel and oxidant, a pipe 40 which supplies fuel to the combustor 20, and a pipe 41 which supplies oxidant to the combustor 20.

The pipe 40 includes a flow rate regulating valve 21 which regulates a flow rate of the fuel to be supplied to the combustor 20. Here, for example, hydrocarbon such as methane and natural gas is used as the fuel. Further, for example, cool gasification gas fuel containing carbon monoxide, hydrogen, and the like can also be used as the fuel.

The pipe 41 includes a flow rate regulating valve 22 which regulates a flow rate of the oxidant to be supplied to the combustor 20. Further, a compressor 23 which compresses the oxidant is provided at the pipe 41. Oxygen separated from the atmosphere by an air separator (not-illustrated) is used as the oxidant. The oxidant flowing through the pipe 41 is heated by passing through a later-described heat exchanger 24 and is supplied to the combustor 20.

The fuel and the oxidant guided to the combustor 20 generate a reaction (combustion) in a combustion area are turned into combustion gas. Here, it is preferred that no excess oxidant (oxygen) or fuel remains in the combustion gas exhausted from the combustor 20 in the gas turbine facility 10. Accordingly, the flow rates of the fuel and the oxidant are regulated to be of, for example, a stoichiometric mixture ratio (equivalence ratio 1). Note that the equivalence ratio mentioned here is an equivalence ratio (overall equivalence ratio) when it is assumed that the fuel and the oxygen are uniformly mixed.

The gas turbine facility 10 includes a turbine 25 which is rotated by the combustion gas exhausted from the combustor 20. For example, a generator 26 is coupled to this turbine 25.

The combustion gas exhausted from the combustor 20, which is mentioned here, is the one containing a combustion product generated from the fuel and the oxidant and later-described carbon dioxide (combustion gas from which water vapor has been removed) supplied to the combustor 20.

The combustion gas exhausted from the turbine 25 is guided to a pipe 42 and cooled by passing through the heat exchange 24. At this time, the oxidant flowing through the pipe 41 and the carbon dioxide flowing through the pipe 42 are heated due to heat radiation from the combustion gas.

The combustion gas having passed through the heat exchanger 24 passes through a cooler 27. The combustion gas passes through the cooler 27, and thereby, the water vapor contained in the combustion gas is removed. At this time, the water vapor in the combustion gas condenses into water. The water is exhausted through, for example, a pipe 43 to the outside.

Here, as described above, when the flow rates of the fuel and the oxidant are regulated so as to have the stoichiometric mixture ratio (equivalence ratio 1), components of the combustion pas from which the water vapor has been removed (dry combustion gas) are mostly carbon dioxide. Note that a slight amount, for example, 0.2% or less of carbon monoxide is sometimes mixed in the combustion gas from which the water vapor has been removed, but hereinafter, the combustion gas from which the water vapor has been removed is simply referred to as carbon dioxide.

The carbon dioxide is compressed by a compressor 28 interposed in the pipe 42 to become supercritical fluid. A part of the compressed carbon dioxide flows through the pipe 42 and is heated in the heat exchange 24. Then, the carbon dioxide is guided into a cylinder 80 which surrounds a periphery of the combustor 20. A temperature of the carbon dioxide having passed through the heat exchanger 24 becomes about 700° C. Note that the pipe 42 which guides this high-temperature carbon dioxide into the cylinder 80 functions as a high-temperature combustion gas supply pipe.

Anther part of the compressed carbon dioxide is introduced to a pipe 44 branching off from the pipe 42. The carbon dioxide introduced to the pipe 44 is regulated in flow rate by a flow rate regulating valve 29, and is guided between a combustor casing 70 and the cylinder 80 as a cooling medium. A temperature of the carbon dioxide guided between the combustor casing 70 and the cylinder 80 by the pipe 44 is about 400° C. Note that the pipe 44 functions as a low-temperature combustion gas supply pipe.

Meanwhile, the remaining part of the compressed carbon dioxide is introduced to a pipe 45 branching off from the pipe 42. The carbon dioxide introduced to the pipe 45 is regulated in flow rate by a flow rate regulating valve 30 and is exhausted to the outside. Note that the pipe 45 functions as an exhaust pipe. The carbon dioxide exhausted in the outside can be utilized for, for example, EOR (Enhanced Oil Recovery) or the like employed at an oil drilling field.

Next, a constitution in the combustor casing 70 of the gas turbine facility 10 of the first embodiment will be described in detail.

Figure 2:
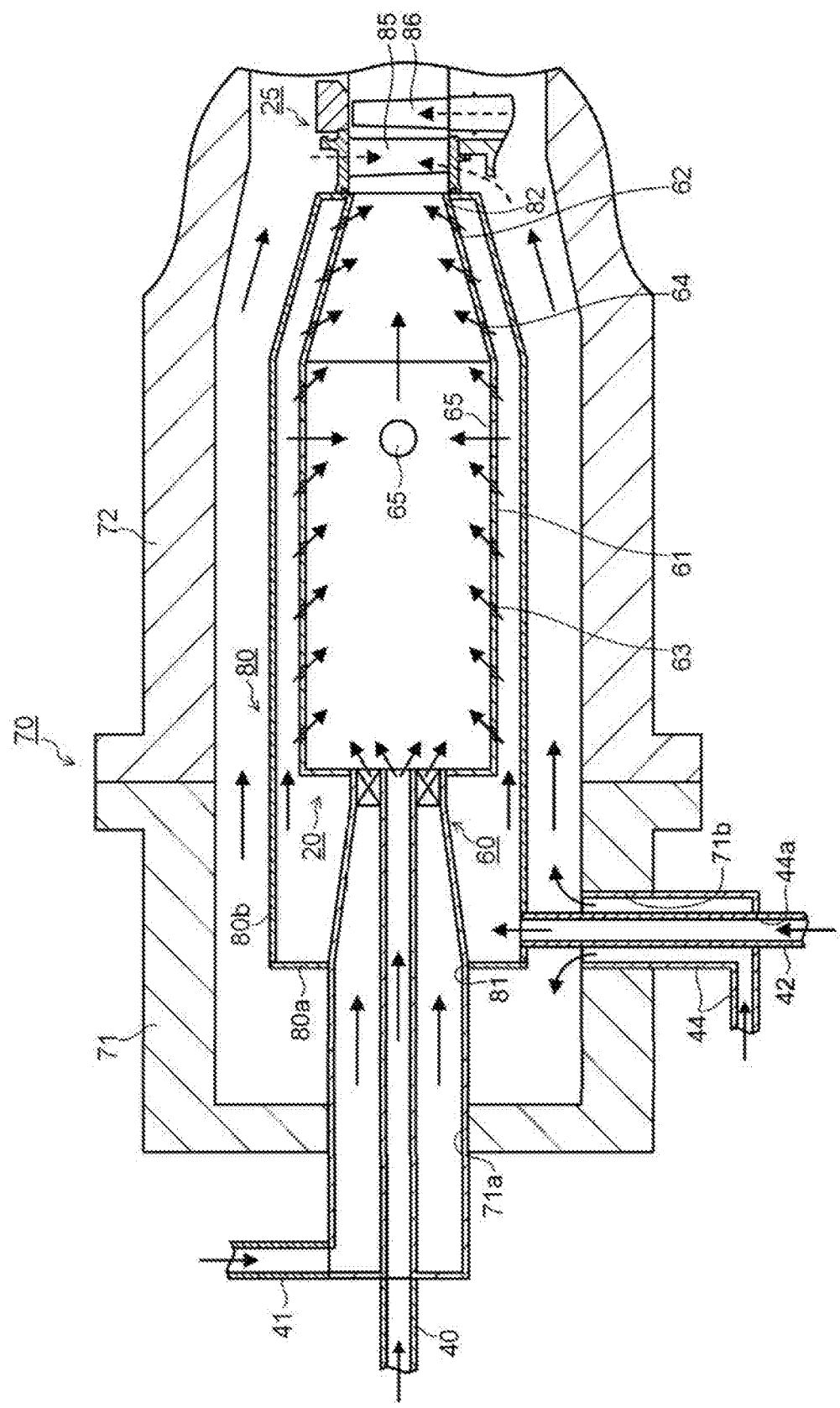
FIG. 2 is a view schematically illustrating a vertical section of a combustor and a combustor casing which are provided in the gas turbine facility of the first embodiment.

FIG. 2 is a view schematically illustrating a vertical section of the combustor 20 and the combustor casing 70 which are provided in the gas turbine facility 10 of the first embodiment.

As illustrated in FIG. 2, the combustor 20 includes a fuel nozzle part 60, a combustor liner 61 and a transition piece 62 (tail pipe). The fuel nozzle part 60 jets the fuel supplied from the pipe 40 and the oxidant supplied from the pipe 41 into the combustor liner 61. For example, the fuel is jetted from a center, and the oxidant is jetted from a periphery of the center. The combustor 20 is accommodated inside the combustor casing 70.

The combustor casing 70 is provided along a longitudinal direction of the combustor 20 so as to surround the combustor 20. The combustor casing 70 is, for example, divided into two parts in the longitudinal direction of the combustor 20. The combustor casing 70 is constituted by, for example, an upstream side casing 71 on an upstream side and a downstream side casing 72 on a downstream side. Note that the combustor casing 70 functions as a casing.

The upstream side casing 71 is formed of, for example, a cylinder in winch one end (upstream end) is closed and the other end (downstream end) is opened. At a center of the one end, an opening 71a in which the fuel nozzle part 60 is inserted is formed. Besides, the pipe 44 is coupled to a side part of the upstream side casing 71. The pipe 44 is, for example, fitted and bonded to an opening 71b formed at the side part of the upstream side casing 71.

The downstream side casing 72 is formed of a cylinder in which both ends are opened. One end of the downstream side casing 72 is connected to the upstream side casing 71 and the other end of the downstream side casing 72 is connected to, for example, a casing surrounding the turbine.

As illustrated in FIG. 2, there is provided the cylinder 80 surrounding a periphery of the combustor 20 and dividing a space between the combustor casing 70 and the combustor 20 in the combustor casing 70. A predetermined space is held between the combustor 20 and the cylinder 80.

On end (upstream end) of the cylinder 80 is closed, and there is formed an opening 81 in which the fuel nozzle part 60 is inserted. The other end (downstream end) of the cylinder 80 is closed, and there is formed an opening 82 where a downstream end of the transition 62 is penetrated.

The cylinder 80 is formed by, for example, bonding a plate-shaped lid member 80a including the opening 71a to a cylindrical main body member 80b. The cylinder 80 is assembled as, for example, described below. The fuel nozzle part 60 is penetrated through the opening 71a of the lid member 80a. Then, the combustor casing 70 including the fuel nozzle part 60 is inserted into the main body member 80b. After that, the lid member 80a is bonded to the main body member 80b.

Note that an assembling constitution of the cylinder 80 is not limited thereto. The assembling constitution of the cylinder 80 is not limited as long as the cylinder 80 has a structure surrounding the periphery of the combustor 20 as illustrated in FIG. 2.

An inner peripheral surface of the opening 82 on the downstream side of the cylinder 80 is in contact with an outer peripheral surface at the downstream end part of the transition piece 62.

Besides, the pipe 42 is coupled to a side part on an upstream side of the cylinder 80. The pipe 42 penetrates inside the pipe 44 coupled to the side part of the upstream side casing 71, and is coupled to the side part of the cylinder 80, as illustrated in FIG. 2. A part where the pipe 42 penetrates inside the pipe 44 has a double-pipe structure.

Note that the pipe 42 is inserted into the pipe 44 through, for example, an opening 44a formed at the pipe 44. At an opening part including the opening 44a, the pipe 42 is bonded to the pipe 44. Besides, the double-pipe structure of the pipe 42 and the pipe 44 is not limited to one point, but may be held at a plurality of points in a circumferential direction.

Here, flow of the carbon dioxide introduced from each of the pipe 42 and the pipe 44 is explained.

The carbon dioxide introduced from the pipe 42 into the cylinder 80 flows at an annular space between the combustor liner 61 and the cylinder 80 toward a downstream side. At this time, the carbon dioxide cools the combustor liner 61 and the transition piece 62.

The carbon dioxide is introduced into the combustor liner 61 and the transition piece 62 from, for example, holes 63, 64 of a porous film cooling part, dilution holes 65, and so on of the combustor liner 61 and the transition piece 62.

As stated above, a whole amount of the carbon dioxide introduced from the pipe 42 is introduced into the combustor liner 61 and the transition piece 62. Note that the carbon dioxide introduced into the combustor liner 61 and the transition piece 62 is introduced to the turbine 25 together with the combustion gas produced by combustion.

Here, a temperature of the carbon dioxide introduced from the pipe 42 is about 700° C. This temperature of the carbon dioxide is lower compared to a temperature of the combustion gas to which the combustor liner 61 and the transition piece 62 are exposed. Accordingly, the combustor liner 61 and the transition piece 62 can be sufficiently cooled by this carbon dioxide. Further, since the temperature of the carbon dioxide is about 700° C., a combustion state is not impaired due to the carbon dioxide introduced into the combustor liner 61.

As stated above, the carbon dioxide introduced from the pipe 42 is introduced to the turbine 25 without flowing out toward the combustor casing 70 side from the cylinder 80 surrounding the periphery of the combustor 20.

Meanwhile, the low-temperature carbon dioxide flowing through the pipe 44 is guided to the double pipe constituted by the pipe 42 and the pipe 44. The carbon dioxide guided to the double pipe passes through the pipe 44, and is guided between the combustor casing 70 and the cylinder 80. Specifically, the carbon dioxide guided to the double pipe passes through an annular path between the pipe 42 and the pipe 44, and is guided between the combustor casing 70 and the cylinder 80.

The carbon dioxide flowing between the pipe 42 and the pipe 44 cools the bonding part between the pipe 42 and the pipe 44, and the pipe 42 penetrating inside the pipe 44. Besides, the low-temperature carbon dioxide flows at a periphery of the pipe 42, and therefore, heat transfer from the pipe 42 where the high-temperature carbon dioxide flows to the combustor casing 70 is suppressed.

The carbon dioxide guided between the combustor casing 70 and the cylinder 80 flows at an annular space between the combustor casing 70 and the cylinder 80 toward the downstream side. As this time, the carbon dioxide cools the combustor casing 70 and the cylinder 80. This carbon dioxide is also used for cooling of, for example, stator blades 85 and rotor blades 86 of the turbine 25. A temperature of the combustor casing 70 becomes, for example, 400° C. or less due to the cooling as stated above.

As described above, the combustor casing 70 is cooled by the low-temperature carbon dioxide without being exposed to the high-temperature carbon dioxide. The combustor casing 70 is therefore composed of, for example, Fe(iron)-based heat resistant steel such as CrMoV steel, CrMo steel.

As described above, according to the gas turbine facility 10 of the first embodiment, the cylinder 80 and the pipe 42 coupled to the cylinder 80 are included, and thereby, the combustor casing 70 is not exposed to the high-temperature carbon dioxide. Besides, the low-temperature carbon dioxide flows between the combustor casing 70 and the cylinder 80, and thereby, it is possible to suppress increase in the temperature of the combustor casing 70.

The combustor casing 70 can be thereby composed of, for example, inexpensive Fe-based heat resistant steel. Accordingly, it is possible to reduce a manufacturing cost of the gas turbine facility 10.

Figure 3:
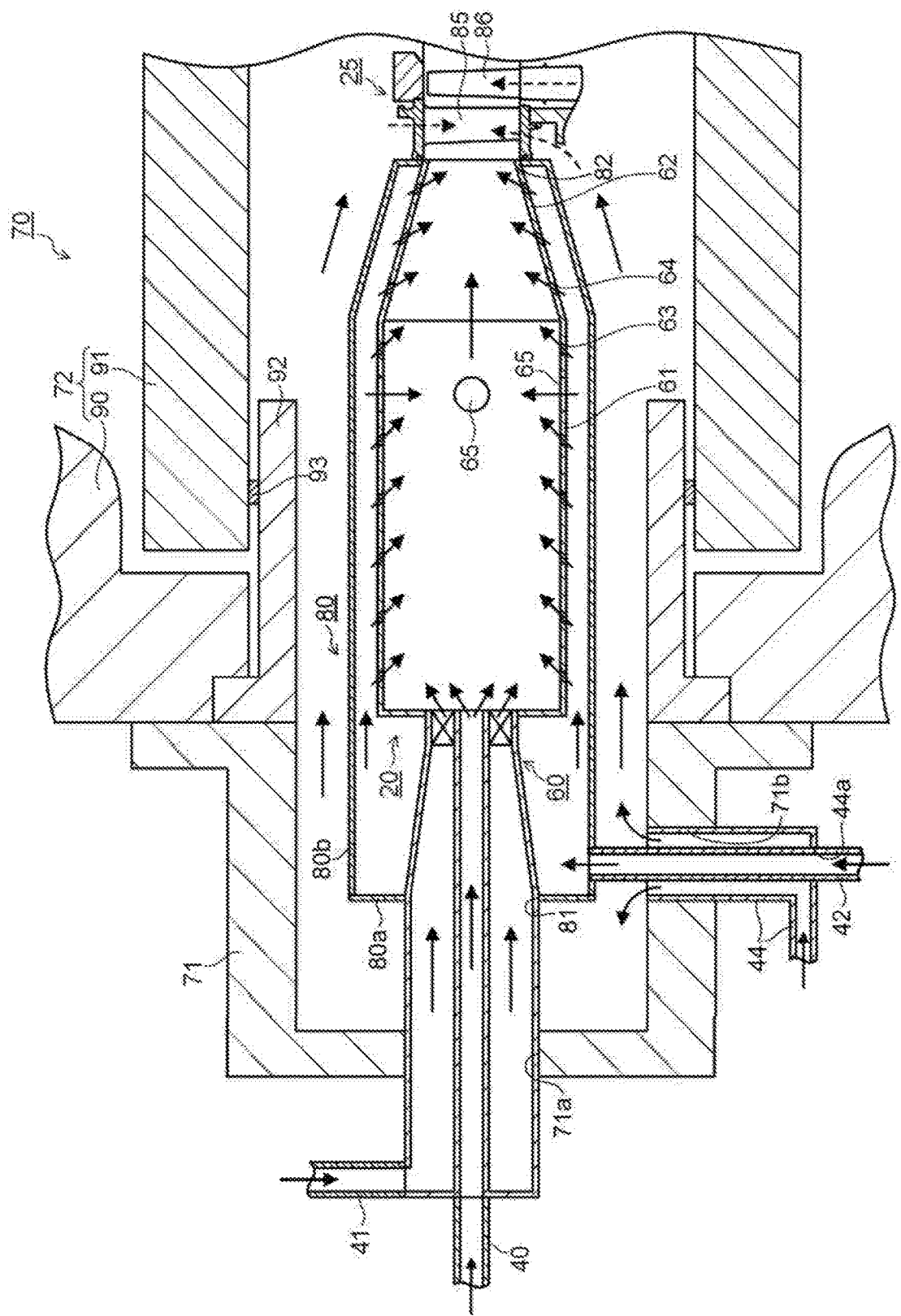
FIG. 3 is a view schematically illustrating a vertical section of the combustor and the combustor casing having another constitution which are provided in the gas turbine facility of the first embodiment.

Here, the constitution of the combustor casing 70 in the gas turbine facility 10 of the first embodiment is not limited to the one described above. FIG. 3 is a view schematically illustrating a vertical section of the combustor 20 and the combustor casing 70 with another constitution which are provided in the gas turbine facility 10 of the first embodiment.

For example, when a working pressure in a gas turbine becomes high as in a case where supercritical fluid carbon dioxide is used as a part of working fluid, it is preferable that, for example, a double casing structure of an outer casing and an inner casing is employed. In FIG. 3, there is illustrated one example in a case where the double casing structure is employed.

As illustrated in FIG. 3, the combustor casing 70 includes, for example, the upstream side casing 71 on the upstream side and the downstream side casing 72 on the downstream side. The downstream side casing 72 includes an outer casing 90 and an inner casing 91 inside the outer casing 90. Further, at an inner periphery between the outer casing 90 and the inner casing 91, a cylindrical sleeve 92 is provided alone a longitudinal direction of the combustor 20.

Between the sleeve 92 and the inner casing 91, for example, an annular seal ring 93 is fitted. Including the seal ring 93 prevents the carbon dioxide from leaking out from between the outer casing 90 and the inner casing 91. Note that, here, the outer casing 90 and the sleeve 92 are connected to a downstream side end face of the upstream side casing 71.

In a case where the above constitution is included, the low-temperature carbon dioxide guided between the combustor casing 70 and the cylinder 80 flows between the cylinder 80 and the upstream side casing 71, the sleeve 92 and the inner casing 91 toward downstream. At this time, the low-temperature carbon dioxide cools the upstream side casing 71, the cylinder 80, the sleeve 92 and the inner casing 91.

Accordingly, the upstream side casing 71, the sleeve 92 and the inner casing 91 can be composed of, for example, the inexpensive Fe-base heat resistant steel. Note that the outer casing 90, provided on an outer peripheral side than the sleeve 92 and the inner casing 91, can also be composed of the inexpensive Fe-based heat resistant steel.

Second Embodiment

Figure 4:
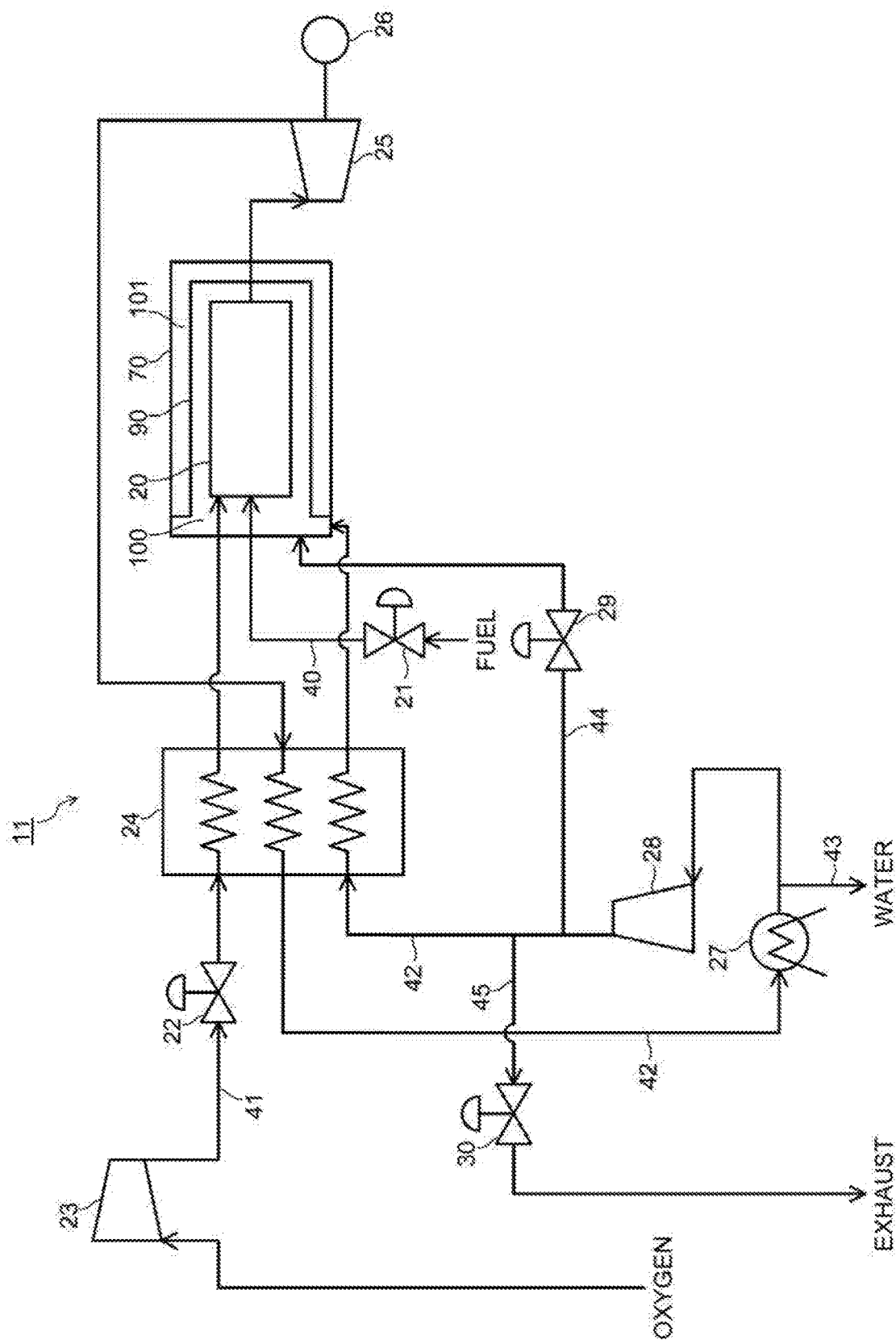
FIG. 4 is a system diagram of a gas turbine facility of a second embodiment.
Figure 5:
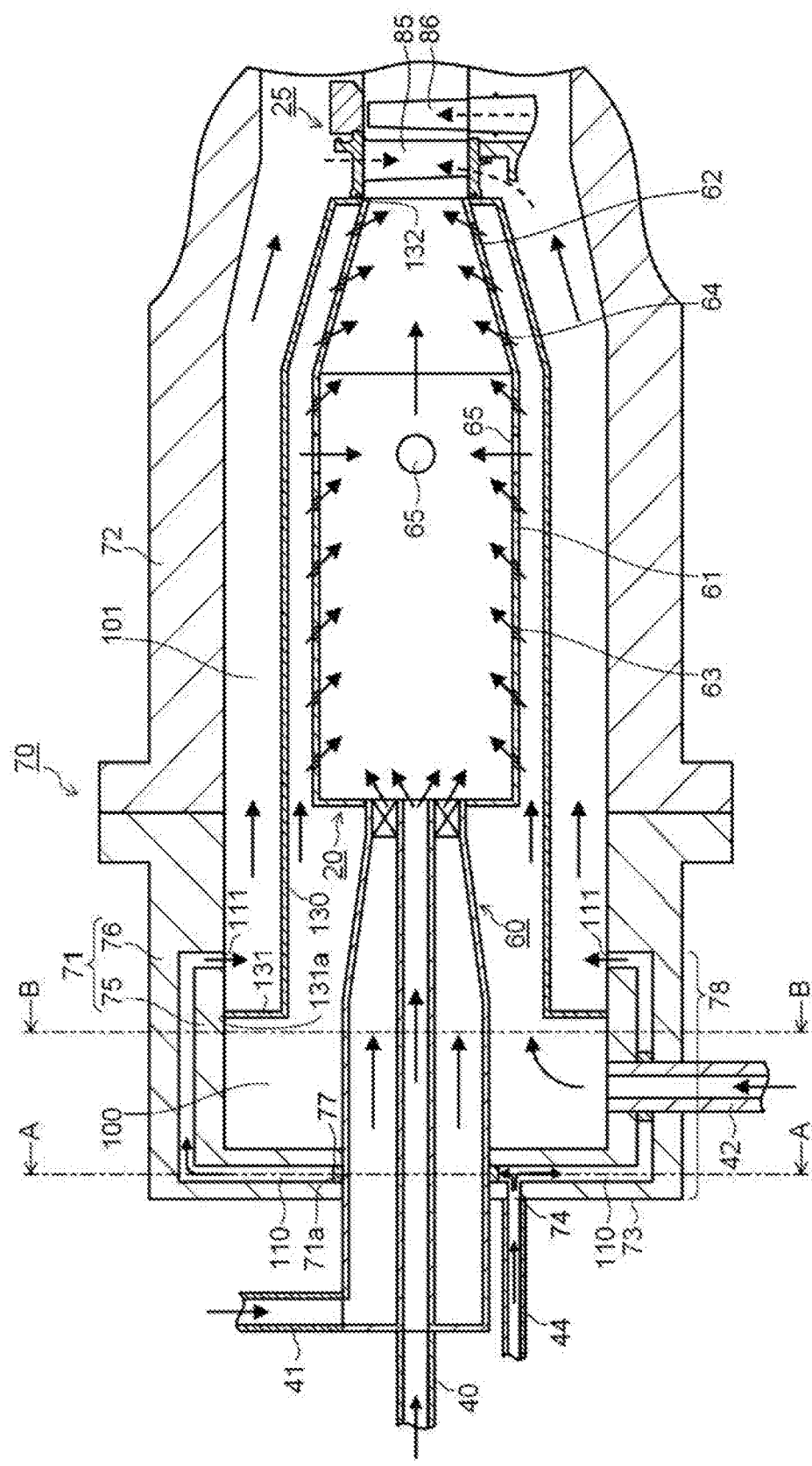
FIG. 5 is a view schematically illustrating a vertical section of a combustor and a combustor casing which are provided in the gas turbine facility of the second embodiment.

FIG. 4 is a system diagram of a gas turbine facility 11 of a second embodiment. FIG. 5 is a view schematically illustrating a vertical section of the combustor 20 and the combustor casing 70 which are provided in the gas turbine facility 11 of the second embodiment. Note that the same constituent parts as those of the gas turbine facility 10 of the first embodiment are denoted by the same reference signs, and redundant descriptions are omitted or simplified.

As illustrated in FIG. 4, a part of the carbon dioxide compressed by the compressor 28 flows through the pipe 42 and is heated in the heat exchanger 24. Then, the carbon dioxide is guided to an inner space 100 divided by a cylinder 130. Note that the pipe 42 functions as the high-temperature combustion gas supply pipe.

Another part of the compressed carbon dioxide is introduced to the pipe 44 branching off from the pipe 42. The pipe 44 is coupled to the combustor casing 70 forming the inner space 100. Note that the pipe 44 is coupled to a flow path formed at a thick inner part of the combustor casing 70 forming the inner space 100, though it will be described later in detail.

Accordingly, the carbon dioxide introduced to the pipe 44 is introduced to the flow path as a cooling medium. Note that this flow path communicates with an outer space 101 divided by the cylinder 130. Note that the pipe 44 functions as the low-temperature combustion gas supply pipe.

Next, a constitution in the combustor casing 70 of the turbine facility 11 of the second embodiment is described in detail.

As illustrated in FIG. 5, the cylinder 130 dividing a space is provided between the combustor casing 70 and the combustor 20. This cylinder 130 is provided along the longitudinal direction of the combustor 20 between the combustor casing 70 and the combustor 20.

One end (upstream end) of the cylinder 130 is opened. Besides, the one end of the cylinder 130 includes, for example, an annular part 131 bending toward an outer peripheral side. An outer peripheral surface 131a of the annular part 131 is bonded to, for example, an inner peripheral surface of the upstream side casing 71.

The other end (downstream end) of the cylinder 130 is closed, and there is formed an opening 132 where the downstream end of the transition piece 62 is penetrated. An inner peripheral surface of the opening 132 on the downstream side of the cylinder 130 is in contact with an outer peripheral surface of the downstream end part of the transition piece 62.

That is, the cylinder 130 divides the space between the combustor casing 70 and the combustor 20 into the inner space 100 and the outer space 101. The inner space 100 is a apace on the combustor liner 61 side (the fuel nozzle part 60 side) divided by the cylinder 130. Note that the inner space 100 is also formed by a part of an inner surface of the upstream side casing 71. The outer space 101 is a space on the combustor casing 70 side divided by the cylinder 130.

The opening 71a in which the fuel nozzle part 60 is inserted is formed at the center of one end of the upstream side casing 71. Besides, a flow path 110 communicating with the outer space 101 is formed at a thick inner part of the upstream side casing 71.

The flow path 110 communicates with the pipe 44 through an opening 74 formed at one end surface 73 of the upstream side casing 71. Outlets 111 of the flow path 110 are opened to the outer space 101. These outlets 111 are each formed of, for example, slits or a plurality of holes, and so on. Note that a part of the upstream side casing 71 where the flow path 110 is included functions as a flow path forming part 78.

Here, the thick inner part of the upstream side casing 71 is a thick part between an inner surface and an outer surface of the upstream side casing 71.

Further, the pipe 42 is coupled to the side part on the upstream side of the upstream side casing 71. This pipe 42 communicates with the inner space 100. That is, a position where the pipe 42 is coupled is on the upstream side than a position where the annular part 131 of the cylinder 130 is connected to the inner peripheral surface of the upstream side casing 71. Besides, the pipe 42 is coupled by, for example, penetrating the flow path forming part 78.

A structure of the flow path 110 at the thick inner part of the upstream side casing 71 is not limited to the above-stated structure. A structure capable of cooling the upstream side casing 71 which faces the inner space 100 and to which the pipe 42 is coupled by means of the low-temperature carbon dioxide flowing through the flow path 110 can be used as the structure of the flow path 110. Further, a structure guiding the carbon dioxide passing through the flow path 100 to the outer space 101 can be used as the structure of the flow path 110.

Here, the upstream side casing 71 is formed by bonding two cylindrical structures of, for example, an internal structure 75 and an external structure 76 as illustrated in FIG. 5. Specifically, the upstream side casing 71 is formed as, for example, described below.

At a part constituting the opening 71a where the fuel nozzle part 60 is inserted, an annular ring 77 is sandwiched between the internal structure 75 and the external structure 76, and it is weld-bonded from an inner surface side of the opening 71a. At a part constituting each outlet 111 of the flow path 110, an annular ring is sandwiched between the internal structure 75 and the external structure 76, and it is weld-bonded from an inner surface side of the upstream side casing 71. Slits, holes, and so on are formed at each annular ring constituting the outlet 111.

A gap with a predetermined interval is thereby formed between the internal structure 75 and the external structure 76. That is, the flow path 110 is formed at the thick inner part of the upstream side casing 71.

Subsequently, a through hole to insert the pipe 42 is processed. Then, the pipe 42 is inserted into the through hole, and for example, it is weld-bonded from an inside of the upstream side casing 71 and an outside of the upstream side casing 71.

Note that a forming method of the flow path 110 at the thick inner part of the upstream side casing 71 is not limited to the above-stated method. That is, other methods can be used as long as it is a method capable of forming the flow path 110 at the thick inner part of the upstream side casing 71.

Here, flow of the carbon dioxide introduced from each of the pipe 42 and the pipe 44 is explained.

The carbon dioxide introduced from the pipe 42 to the inner space 100 flows at an annular space between the combustor liner 61 and the cylinder 130 toward a downstream side. At this time, the carbon dioxide cools the combustor liner 61 and the transition piece 62.

The carbon dioxide is introduced into the combustor liner 61 and the transition piece 62 as is described in the first embodiment. At this time, the combustor liner 61 and the transition piece 62 are cooled. Note that a whole amount of the carbon dioxide introduced from the pipe 42 is introduced into the combustor liner 61 and the transition piece 62.

As stated above, the carbon dioxide introduced from the pipe 42 does not flow out toward the combustor casing 70 side than the cylinder 130.

Meanwhile, the low-temperature carbon dioxide flowing through the pipe 44 is guided to the flow path 110 through the opening 74 of the upstream side casing 71. The carbon dioxide guided to the flow path 110 flows toward the outlets 111 while spreading throughout the flow path 110. At this time, the carbon dioxide cools the upstream side casing 71.

Besides, the carbon dioxide flowing through the flow path 110 also flows at a periphery of the pipe 42 penetrating the flow path forming part 78. Accordingly, there is suppressed heat transfer from the pipe 42 where the high-temperature carbon dioxide flows to the upstream side casing 71.

The carbon dioxide guided from the outlets 111 to the outer space 101 flows at an annular space between the combustor casing 70 and the cylinder 130 toward the downstream side. At this time, the carbon dioxide cools the combustor casing 70 and the cylinder 130. This carbon dioxide is also used for cooling of, for example, the stator blades 85 and the rotor blades 86 of the turbine 25. A temperature of the combustor casing 70 (the upstream side casing 71 and the downstream side casing 72) becomes, for example, 400° C. or less due to the cooling as stated above.

The low-temperature carbon dioxide flows through the flow path 110, and thereby, it is possible to suppress increase in the temperature of the upstream side casing 71 which is exposed to the high-temperature carbon dioxide. Further, the combustor casing 70 facing the outer space 101 is cooled by the low-temperature carbon dioxide without being exposed to the high-temperature carbon dioxide. The combustor casing 70 is therefore composed of, for example, Fe(iron)-based heat resistant steel such as CrMoV steel, CrMo steel.

As stated above, according to the gas turbine facility 11 of the second embodiment, the flow path 110 is included, and thereby, there can be suppressed the increase in the temperature of the upstream side casing 71 which is exposed to the high-temperature carbon dioxide. Besides, the cylinder 130 is included, and thereby, the combustor casing 70 facing the outer space 101 is not exposed to the high-temperature carbon dioxide. Besides, the low-temperature carbon dioxide flows at the outer space 101, and thereby, the increase in the temperature of the combustor casing 70 can be suppressed.

It is thereby possible that the combustor casing 70 is composed of, for example, inexpensive Fe(iron)-based heat resistant steel. It is therefore possible to reduce the manufacturing cost of the gas turbine facility 11.

Figure 6:
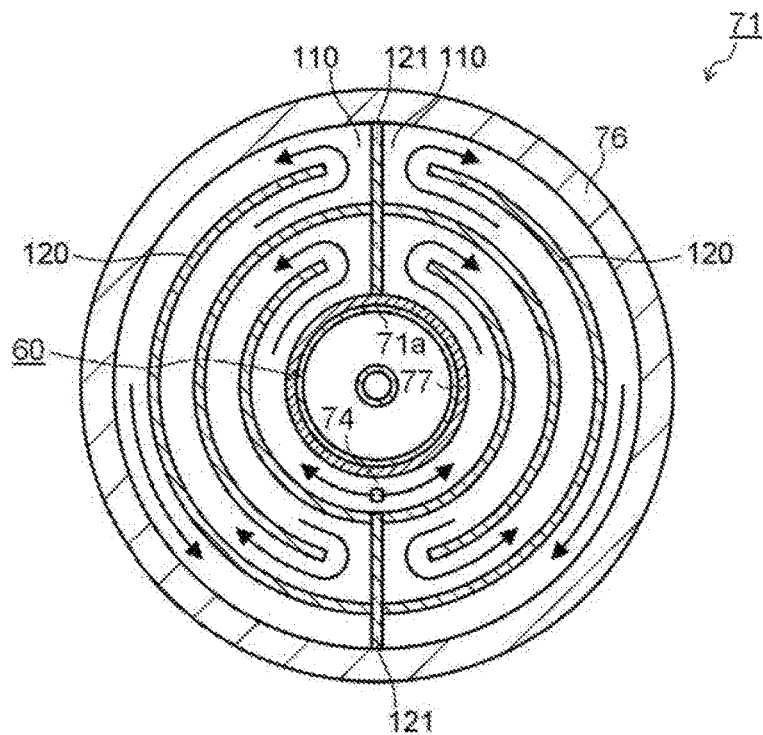
FIG. 6 is a cross section corresponding to an A-A cross section in FIG. 5, and is a view illustrating a part of another flow path in the combustor casing of the gas turbine facility of the second embodiment.
Figure 7:
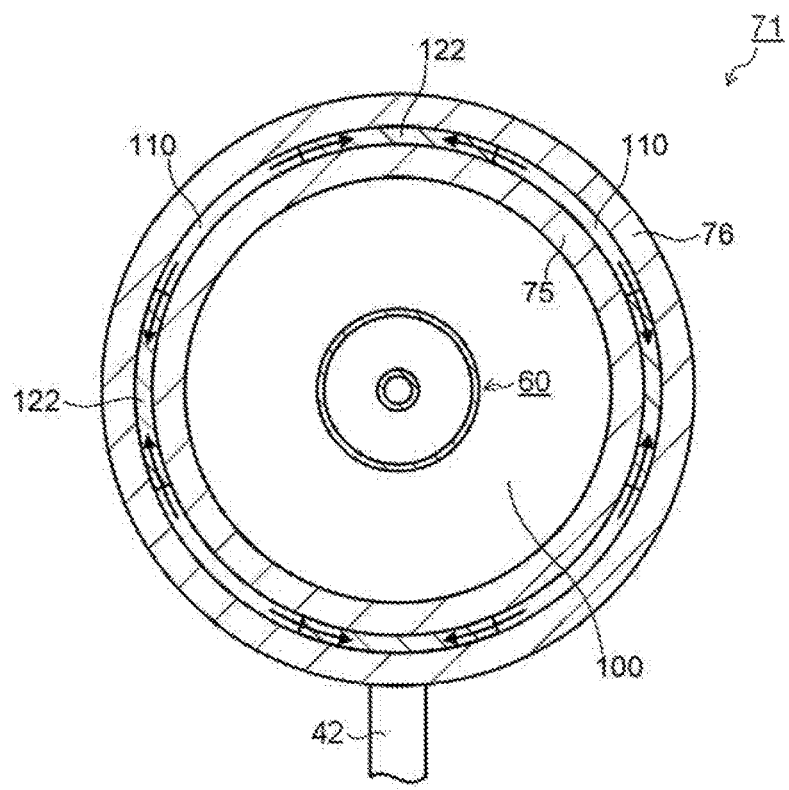
FIG. 7 is a cross section corresponding to a B-B cross section in FIG. 5, and is a view illustrating a part of another flow path in the combustor casing of the gas turbine facility of the second embodiment.
Figure 8:
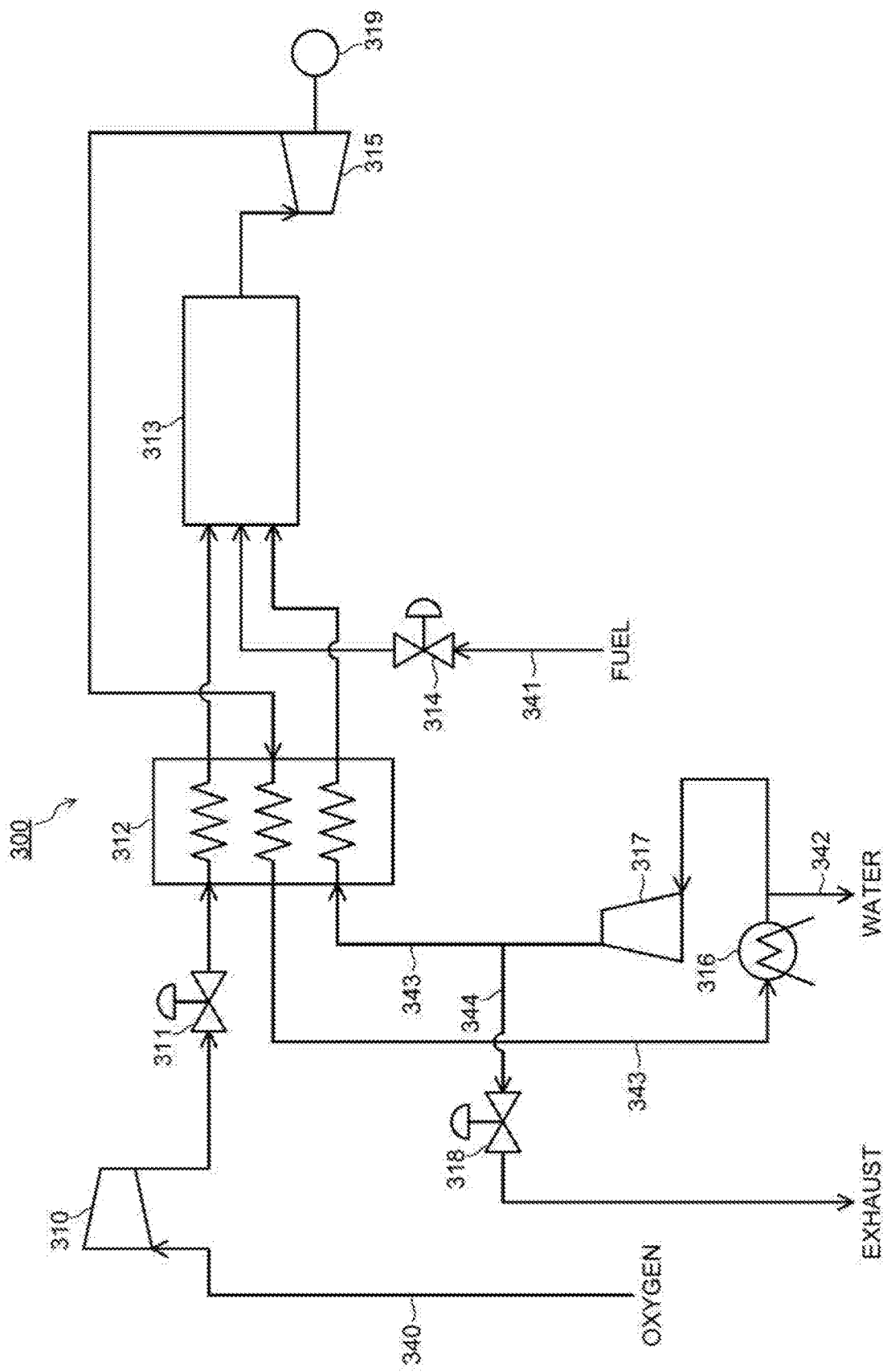
FIG. 8 is a system diagram of a conventional gas turbine facility.
Figure 9:
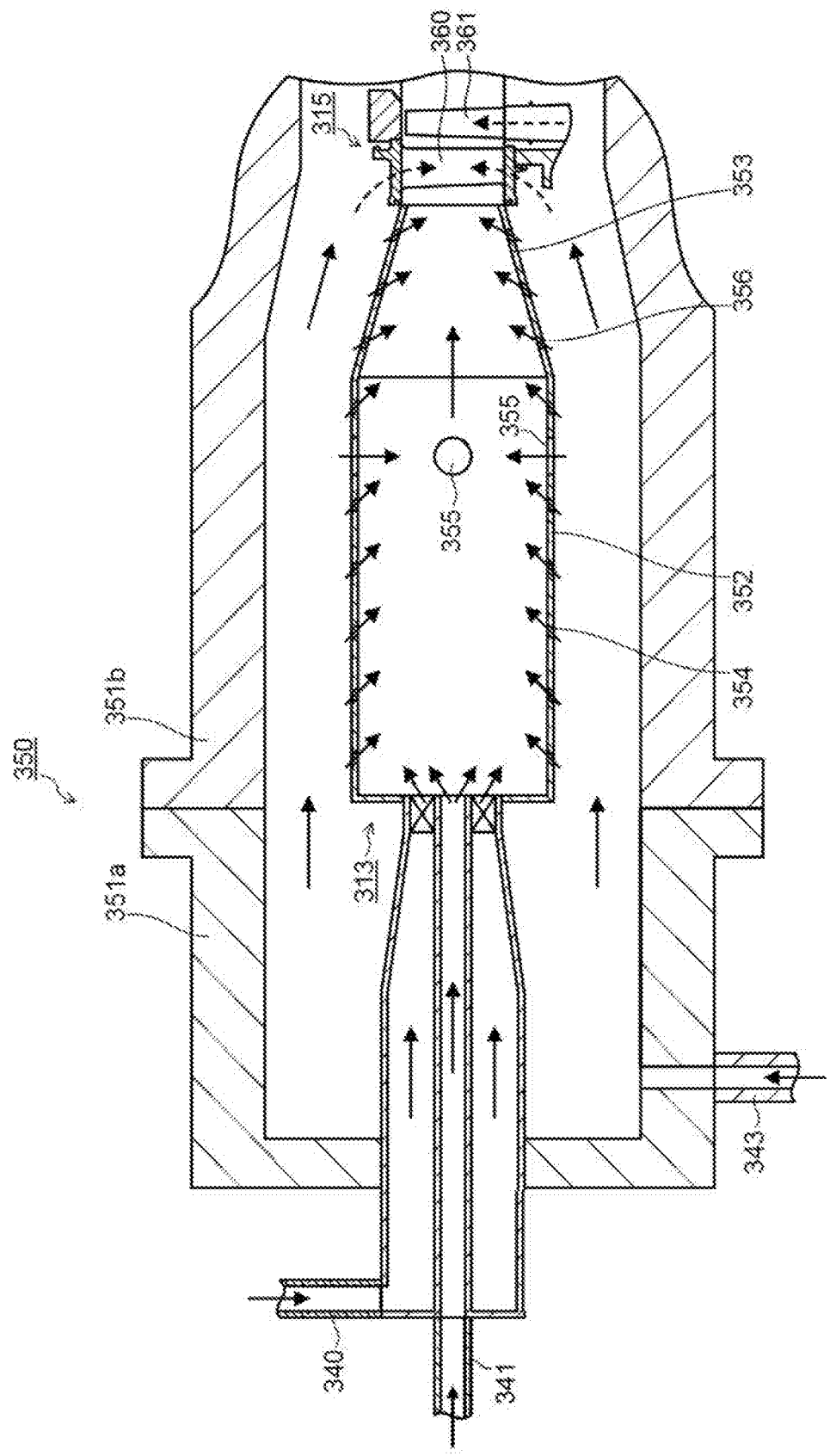
FIG. 9 is a view schematically illustrating a vertical section of a combustor which is provided in the conventional gas turbine facility.

Here, the constitution of the flow path 110 is not limited to the above-stated constitution. FIG. 6 is a cross section corresponding to an A-A cross section in FIG. 5, and is a view illustrating a part of another flow path 110 in the combustor casing 70 of the gas turbine facility 11 of the second embodiment. FIG. 7 is a cross section corresponding to a B-B cross section in FIG. 5, and is a view illustrating a part of another flow path 110 in the combustor casing 70 of the gas turbine facility 11 of the second embodiment.

An illustrated in FIG. 6 and FIG. 7, a plurality of flow path walls 120, 121, 122 may be provided at the flow path 110. The flow path walls 120, 121, 122 are each formed of, for example, a plate-shaped rib or the like. Height of the flow path walls 120, 121, 122 each correspond to a distance between the internal structure 75 and the external structure 76.

The flow path wall 120 divides a space between the internal structure 75 and the external structure 76 into, for example, a concentric plurality of flow paths as illustrated in FIG. 6. The flow path 110 is divided into a left half side and a right half side by the flow path wall 121 provided in, for example, a diametrical direction.

Meanwhile, a plurality of flow path walls 122 are provided with a predetermined interval in the flow path 110 at a side part as illustrated in FIG. 7. Columns of the flow path walls 122 provided in a circumferential direction as stated above are provided in a longitudinal direction of the flow path 110 (longitudinal direction of the combustor 20) in a plurality of steps. For example, a position of the flow path between the flow path walls 122 in the circumferential direction is shifted in the circumferential direction relative to a position of the flow path of an adjacent column. It is thereby possible to prevent that the carbon dioxide flows linearly in the longitudinal direction without spreading in the circumferential direction.

In the flow path 110 having the constitution as stated above, the carbon dioxide guided from the opening 74 of the upstream side casing 71 into the flow path 110 flows from an inner side toward an outer side while flowing between the flow paths at the left half side and the right half side in the circumferential direction as illustrated in FIG. 6.

The carbon dioxide flowing in an outer peripheral flow path turns in the longitudinal direction (the longitudinal direction of the combustor 20), and flows toward the outlet 111. At this time, the carbon dioxide flows in the longitudinal direction while spreading at a gap between the flow path walls 122 in the circumferential direction as illustrated in FIG. 7. The carbon dioxide then flows out from the outlets 111 to the outer space 101.

As stated above, the flow path walls 120, 121, 122 are provided, and thereby, the carbon dioxide can be certainly guided throughout the flow path 110. Besides, the carbon dioxide flows in the flow path between the flow path walls 120, 121, and thereby, a flow rate increases compared to a case when the flow path walls 120, 121 are not provided. It is thereby possible to improve heat transfer. It is thereby possible to certainly cool the upstream side casing 71.

Note that a disposing constitution of the flow path walls 120, 121, 122 is not limited to the above-stated constitution. A constitution guiding the carbon dioxide which is guided into the flow path 110 throughout the flow path 110 can serve as the disposing constitution of the flow path walls 120, 121, 122.

Besides, when the flow path walls 122 are included, a through hole penetrating from the external structure 76 to the internal structure 75 through the flow path walls 122 may be formed in FIG. 7. In this case, the pipe 42 is bonded to a side surface of the external structure 76 so as to communicate with the through hole.

Note that the flow path 110 and the cylinder 130 in the second embodiment are able to be applied to the double casing structure as illustrated in FIG. 3.

Here, in each of the gas turbine facilities 10, 11 of the above-stated embodiments, there is illustrated an example where oxygen being the oxidant is supplied to the combustor 20 through the pipe 41, but the constitution is not limited thereto. For example, they may have a constitution where a part of the carbon dioxide compressed by the compressor 28 is supplied into the pipe 41.

In this case, a new pipe branching off from the pipe 42 on the downstream side of the compressor 28 is provided. This branched pipe is, for example, coupled to the pipe 41 between the flow rate regulating value 22 and the heat exchange 24 with reference to FIG. 1. That is, mixed gas composed of the oxidant and the carbon dioxide is guided to the combustor 20. Note that the mixed gas is heated by passing through the heat exchanger 24.

In the above constitution as well, operation and effect similar to the operation and effect in the gas turbine facilities 10, 11 of the above-described embodiments can be obtained.

According to the above-described embodiments, it is possible for the casing provided around the combustor to be composed of inexpensive materials.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalent are intended to cover such forms or modifications as would fall within the scope and spirit of the inventions.

What is claimed is:

1. A gas turbine facility comprising:
    a casing;
    a combustor provided in the casing to combust fuel and oxidant, the combustor having a fuel nozzle part, a combustor liner and a transition piece, the fuel nozzle part being provided at an upstream-side end portion of the combustor liner, the transition piece being connected to a downstream-side end portion of the combustor liner;
    a cylinder surrounding a periphery of the combustor to form a first annular space and a second annular space, the cylinder having a lid member on an upstream end, the lid member being penetrated by the fuel nozzle part, the lid member closing the upstream end of the cylinder, a downstream end of the cylinder being connected to an outer peripheral surface of the transition piece, the downstream end of the cylinder being closed, the first annular space being formed between the cylinder and the combustor, the second annular space being formed between the casing and the cylinder;
    a turbine, rotated by and exhausting, combustion gas from the combustor;
    a heat exchanger which cools the combustion gas exhausted from the turbine to form a cooled combustion gas, and heats a part of the cooled combustion gas;
    a first combustion gas supply pipe penetrating the casing and the cylinder for guiding the part of the cooled combustion gas heated in the heat exchanger into the first annular space; and
    a second combustion gas supply pipe surrounding the first combustion gas supply pipe, which guides another part of the cooled combustion gas cooled in the heat exchanger to the second annular space, a temperature of the another part of the cooled combustion gas cooled in the heat exchanger guided by the second combustion gas supply pipe being lower than a temperature of the part of the cooled combustion gas heated in the heat exchanger guided by the first combustion gas supply pipe.

2. The gas turbine facility according to claim 1,
    wherein the first combustion gas supply pipe penetrates inside of the second combustion gas supply pipe, the first combustion gas supply pipe and the second combustion gas supply pipe form a double-pipe structure,
    wherein the second combustion gas supply pipe is coupled to the casing, and
    wherein the another part of the cooled combustion gas flowing through the second combustion gas supply pipe passes between the first combustion gas supply pipe and the second combustion gas supply pipe to be guided to the second annular space.

3. A gas turbine facility comprising:
    a casing;
    a combustor provided in the casing to combust fuel and oxidant;
    a cylinder provided in a longitudinal direction between the casing and the combustor, the cylinder dividing a space between the casing and the combustor into an outer space and an inner space;
    a turbine, rotated by and exhausting, combustion gas from the combustor;
    a heat exchanger which cools the combustion gas exhausted from the turbine to form a cooled combustion gas, and heats a part of the cooled combustion gas;
    a first combustion gas supply pipe which guides the part of the cooled combustion gas heated in the heat exchanger to the inner space;

a flow path formed in a thickness of the casing, the thickness of the casing being formed between an inner surface and an outer surface of the casing, the flow path being formed along the inner surface and the outer surface of the casing, the flow path communicating with the outer space; and a second combustion gas supply pipe which guides another part of the cooled combustion gas cooled in the heat exchanger to the flow path.

4. The gas turbine facility according to claim 3,
wherein the first combustion gas supply pipe is coupled to the casing by penetrating a flow path forming part where the flow path is included.

5. A gas turbine facility comprising:

a casing;

a combustor provided in the casing to combust fuel and oxidant;

a cylinder provided in a longitudinal direction between the casing and the combustor, the cylinder dividing a space between the casing and the combustor into an outer space and an inner space;

a turbine, rotated by and exhausting, combustion gas from the combustor;

a heat exchanger which cools the combustion gas exhausted from the turbine to form a cooled combustion gas, and heats a part of the cooled combustion gas;

a first combustion gas supply pipe which guides the part of the cooled combustion gas heated in the heat exchanger to the inner space;

a flow path formed in a thickness of the casing, the thickness of the casing being formed between an inner surface and an outer surface of the casing, the flow path extending vertically at an upstream end of the casing, horizontally away from the upstream end of the casing, and vertically again through the inner surface of the casing so as to communicate with the outer space; and a second combustion gas supply pipe which guides another pan of the cooled combustion gas cooled in the heat exchanger to the flow path.

6. The gas turbine facility according to claim 5,
wherein the first combustion gas supply pipe is coupled to the casing by penetrating a flow path forming part where the flow path is included.

* * * * *